United States Patent [19]

Bachhofer et al.

[11] Patent Number: 4,606,892

[45] Date of Patent: Aug. 19, 1986

[54] OZONE GENERATOR OF STACK-TYPE DESIGN, EMPLOYING ROUND PLATE-ELECTRODES

[76] Inventors: Bruno Bachhofer, Säntisstrasse 85, D-7981 Bavendorf; Anton Locher, Bergstrasse 6, D-7981 Torkenweiler, both of Fed. Rep. of Germany

[21] Appl. No.: 624,705

[22] Filed: Jun. 26, 1984

[51] Int. Cl.$^4$ .......................... B01J 19/08; B01J 19/12
[52] U.S. Cl. .............................. 422/186.2; 422/186.07
[58] Field of Search ............ 422/186.07, 186.2, 186.11

[56] References Cited

U.S. PATENT DOCUMENTS

| | | | |
|---|---|---|---|
| 2,561,014 | 7/1951 | Daily | 422/186.07 |
| 3,801,791 | 4/1974 | Schaefer | 422/186.2 |
| 3,891,561 | 6/1975 | Lowther | 422/186.2 |

FOREIGN PATENT DOCUMENTS

| | | |
|---|---|---|
| 3247373 | 6/1984 | Fed. Rep. of Germany ............ 422/186.07 |
| 3247374 | 7/1984 | Fed. Rep. of Germany ............ 422/186.07 |

Primary Examiner—John F. Terapane
Assistant Examiner—Susan Wolffe
Attorney, Agent, or Firm—Spencer & Frank

[57] ABSTRACT

In an ozone generator composed of a plurality of circular, plate-shaped high-voltage electrodes arranged in a stack, the electrodes including at least two solid electrodes which are spaced from one another and a counter-electrode, the generator further being composed of two circular plates of insulating material disposed in the stack between the two solid electrodes, with the counter-electrode being disposed between, and spaced from, the two plates to form therewith two discharge spaces, and with the outer diameter of the counter-electrodes being less than that of the plates, and a ring clamped and squeezed between the plates in the vicinity of their peripheries, the ring is of a gasket material which is initially resilient, and which is formed to have, at each side directed toward a respective plate, at least two beads projecting in the axial direction of the plates and spaced apart in the radial direction of the plates, and the plates are rigidly supported against the two solid electrodes.

6 Claims, 1 Drawing Figure

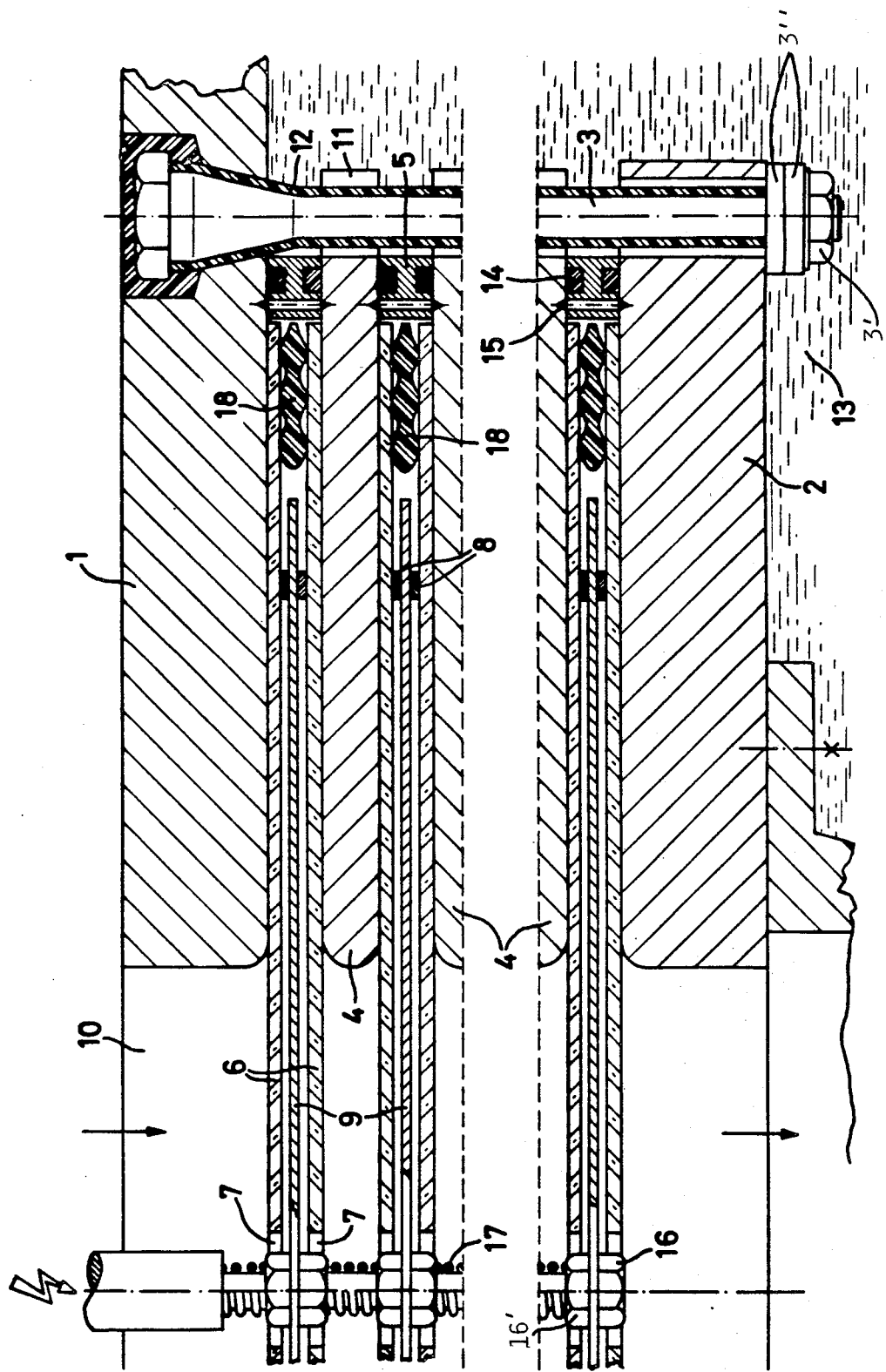

OZONE GENERATOR OF STACK-TYPE DESIGN, EMPLOYING ROUND PLATE-ELECTRODES

BACKGROUND OF THE INVENTION

The present invention relates to an ozone generator of stack-type design, employing round plate-shaped high-voltage electrodes which are braced counter to one another, two plates, made of an insulating material, being located between two solid electrodes which are spaced one from the other, and a counter-electrode being located between the plates which are made of an insulating material, thereby forming two discharge spaces with the plates, the outer diameter of this counter-electrode being smaller than that of the plates which are made of an insulating material and which clamp a ring, running near their edges, in a manner whereby the ring is squeezed between them.

An ozone generator of this generic type is known from German Auslegeschrift [Published Application] No. 1,176,100. Aluminum spacer rings are inserted between the solid aluminum electrodes, which are water-cooled at their outer edges, these spacer rings possessing shoulders which engage behind axial, dish-like projections on the solid electrodes. There then follow two plates, made of an insulating material, namely glass, which are separated from the electrodes by means of sealing washers. These glass plates are spaced, one from the other, by means of a ring which is made of a non-conducting, ozone-resistant material, this ring receiving the counter-electrode at its edge, and supporting it. The stack is held together, at the outer edge, by means of clamping bolts.

However, the above-mentioned ring between the glass plates has no influence on the dielectric strength of the radial insulating section between the counter-electrode and the metal spacer ring, since the sealing washers, inserted between the solid electrodes and the glass plates, prevent the generation of a significant surface pressure between the glass plates and the ring during the process of tightening the clamping bolts. For this reason, the aluminum spacer rings must be designed with an inner diameter, in relation to the outer diameter of the counter-electrodes, equal to that which they would have if the rings made of a non-conducting material were absent. In consquence, for a given external diameter of the assembly, the restricted diameter of the discharge space results in its active area being very small.

In the case of another ozone generator, according to German Pat. No. 2,412,770, there is no corresponding ring between the glass plates. In this generator, the counter-electrodes are held between the glass plates by means of small separators, and the process gas flows over the edges of the counter-electrodes. Here, too, the active area of the discharge space is correspondingly small.

SUMMARY OF THE INVENTION

The object underlying the invention is to simplify the ozone generator, without altering its external diameter, and to increase the ozone yield.

Starting from an ozone generator of the type indicated in the introduction, this object is achieved, according to the invention, by means of a design wherein the ring is composed of a gasket material which is resilient, at least at the time of assembly, this ring facing the plates which are made of an insulating material, and which are rigidly supported against the solid electrodes. Instead of one ring two or three rings of equal circular cross section and different diameter may be concentrically arranged, touching each other in radial direction or with a small space therebetween. Said concentrical rings may be connected by small webs for easier handling, thereby forming a ring possessing two or more radially spaced beads on each of its sides facing the plates. As a result of the rigid support of the insulating plates against the solid electrodes, the whole of the pressure developed by the clamping bolts can become effective between the glass plates and the ring. Initially, contact between the beads and the glass plates takes the form only of narrow strips. As the clamping pressure increases, the contact areas become wider as a result of deformation of the beads. The ring thus forms an excellent high-voltage seal between the glass plates and permits the diameter of the counter-electrode to be decisively increased, successfully achieving a corresponding increase in the ozone yield.

The known ozone generators possess pot, or dish-shaped cooling electrodes with a circular rim. These electrodes necessitate considerable manufacturing expense, and quite frequently exhibit corrosion pits on the surfaces which come into contact with water, these corrosion pits being attributable to electrolytic processes. It is accordingly proposed, in a further embodiment of the invention, that the solid electrodes be flat plates, without joints, receiving, at their edges, interposed spacer rings which are made of a rigid plastic and into which sealing rings are inserted, and that, in order to effect the equipotential interconnection of the solid electrodes, pins be provided, these pins passing through the spacer rings, parallel to the axis of the assembly, in a manner such that their pointed ends penetrate into the surfaces of the electrodes. As a result of these point-shaped, accurately localized potential connections between the cooling electrodes, corrosion phenomena are eliminated. Most important of all, however, flat electrodes are much easier to manufacture.

BRIEF DESCRIPTION OF THE DRAWING

In the text which follows, an illustrative embodiment of the invention is explained by reference to the sole drawing FIGURE, which shows in partial cross section a portion of an ozone generator, in a plane lying in the axial direction, and approximately 1.5 times actual size.

DESCRIPTION OF THE PREFERRED EMBODIMENTS

The components of the ozone generator, which are disposed in a casing (not shown) and are assembled to form a stack, are clamped between two pressure plates 1 and 2 which are held together by means of a circular array of clamping bolts 3 spaced around the periphery of the stack. A plurality of cooling electrodes 4, in the form of ring-shaped aluminum plates 8 mm thick, are spaced from one another, or from the pressure plates 1 and 2, as the case may be, by means of plastic spacer rings 5 near the outer edges of plates 1 and 2. Glass plates 6, 1.5 mm thick, bear against the pressure plates 1 and 2, and against the cooling electrodes 4. Each of these glass plates 6 possesses a central opening 7 centered on the axis of the stack. A counter-electrode 9 is held, with the aid of small, thin spacer plates 8, midway between each two adjacent glass plates 6, the thickness of this counter-electrode 9, and its spacing from each glass plate 6, being approximately 1 mm.

Each of the pressure plates 1 and 2 has a central, circular opening 10, of the same diameter as the central openings in the cooling electrodes 4. At their outer edges, the cooling electrodes 4 possess open slots 11, in order to permit the clamping bolts 3 to pass through, each of these bolts 3 being sheathed with a flexible, insulating tube 12, while their heads are potted in epoxy resin in order to insulate them. At the bottom, the nut 3' is supported against the pressure plate 2 via washers 3" which are made of an insulating material. The purpose of insulating the clamping bolts 3 is to avoid corrosion phenomena resulting from electrochemical processes between the various metals.

In order to seal the interior space with respect to the water 13 which is circulating around the ozone generator, two sealing rings 14 are embedded into each of the spacer rings 5. Radially inwardly of these sealing rings 14, the spacer rings 5 possess one or two holes, drilled parallel to the axis of the assembly and containing steel pins 15. The pointed ends of these pins 15 penetrate the cooling electrodes 4 or, as the case may be, the pressure plates 1 and 2, to a depth of approximately 0.3 mm, in order to provide an equipotential interconnection.

Each of the counter-electrodes 9 possesses a central hole, through which a respective bolt 16 is inserted. The head of each bolt is clamped to its associated counter-electrode 9 by means of an associated nut 16'. Each bolt head and associated nut 16' further serve to seal the central hole in the associated counter-electrode 9. The head of each bolt 16 is provided with a recess for receiving the end of the bolt 16 associated with the next succeeding counter-electrode 9. A compression spring 17 is slipped over the shaft of each bolt 16, this compression spring 17 bearing against the next bolt head with a certain prestress. By this means, all the counter-electrodes 9 are electrically interconnected to a high voltage head. They are at a high electrical potential, ranging up to 12,000 volts.

Those areas of the pressure plates 1 and 2, and of the cooling electrodes 4, against which the glass plates 6 bear, are rendered flat, to a high degree of accuracy, and are smeared with silicone oil during assembly, before placing the glass plates 6 on them. This oil causes the glass plates 6 to adhere, and prevents vibrations, while on the other hand, the dielectric heat produced can transfer to the cooling electrodes 4 even more efficiently.

In order to increase the dielectric strength in the radial direction, between the counter-electrodes 9 and the steel pins 15, or, as the case may be, the outer edges of the cooling electrodes 4, gasket rings 18 are provided, which are squeezed, in the edge zone, between two adjacent glass plates 6. These gasket rings 18 are composed of a silicone. They possess three radially spaced beads on each of the sides facing the glass. This arrangement produces the effect of a cascade of three individual seal locations, the air in the annular chambers formed by each pair of adjacent beads and the common glass surface being expelled during the compression process. In the course of time, the chemical action of the ozone causes the silicone gasket ring to become tough and hard. This, however, does not impair the breakdown-inhibiting effect of the gasket ring, but the gasket ring bakes firmly onto the glass.

The gasket ring 18 permits the diameter of the counter-electrodes 9 to be enlarged by an amount which is considerable in comparison with ozone generators known from the prior art, lacking such a ring, or possessing a ring which is ineffective with regard to the dielectric strength. However, the enlargement of the diameter means that the area of the reaction space is considerably enlarged, and that the flow path of the process gas is lengthened, without any changes in the external dimensions of the ozone generator.

In the case of the ozone generator which has been described, dried air is used as the process gas. It enters through the opening 10 in the pressure plate 1, and then passes, through the opening 7 in the uppermost glass plate 6, into the discharge space between this plate 6 and the uppermost counter-electrode 9. Here, the air travels radially outwards, flows around the edge of the above-mentioned counter-electrode, and travels back on its underside, radially inwards, in order to travel through the openings 7 in the glass plates 6 which follow, and outwards again, in the next discharge space, and so on.

Measurements on an ozone generator, possessing six counter-electrodes and the other dimensions which have been mentioned previously, have yielded results indicating an ozone yield of 27 g per hour, which corresponds to 45 g of ozone per cubic meter of process air under standard conditions, in association with an energy requirement of 17 watt-hours per gram of ozone.

A gasket material which can be employed for the rings 18 is for example a silicone of the type marketed with the designation Si 840 by Heinrich Gehrkens GmbH, D-2000 Hamburg 54, Federal Republic of Germany. The initial resiliencey value is 65 Shore A. In an exemplary embodiment the beads have—before compression—a circular cross section with a diameter (axial ring thickness) of 4.0 Millimeters. The axial thickness between the bottoms of two opposed chambers is 1.2 mm. Built in and under compression, the beads will be flattened and the axial thickness will be reduced to between 3.3 mm and 3.5 mm. The radial width of the ring shown is 20 mm.

It will be understood that the above description of the present invention is susceptible to various modifications, changes and adaptations, and the same are intended to be comprehended within the meaning and range of equivalents of the appended claims.

What is claimed is:

1. In an ozone generator composed of a plurality of circular, plate-shaped high-voltage electrodes arranged in a stack, the electrodes including at least two solid electrodes which are spaced from one another and a counter-electrode, the generator further being composed of two circular plates of insulating material disposed in the stack between the two solid electrodes, with the counter-electrode being disposed between, and spaced from, the two plates to form therewith two discharge spaces, and with the outer diameter of the counter-electrode being less than that of the plates, and a ring clamped and squeezed between the plates in the vicinity of their peripheries, the improvement wherein said ring is of a gasket material which is initially resilient and which is selected for increasing the dielectric strength, and inhibiting electrical break-down, in the radial direction of said circular plates between the periphery of said counter-electrode and said solid electrodes, and wherein said plates are rigidly supported against said two solid electrodes.

2. Ozone generator according to claim 1, wherein said ring is formed to have, at each side directed toward a respective plate, at least two beads projecting in the axial direction of said plates and spaced apart in the radial direction of said plates.

3. Ozone generator according to claim 1, wherein said solid electrodes are flat plates without joints, and further comprising: a spacer ring of a rigid plastic interposed between said solid electrodes, at the peripheries thereof; sealing rings inserted into said spacer ring for forming a seal between said spacer ring and each said solid electrode; and a conductive pin having pointed ends, said pin extending through said spacer ring in the axial direction of said solid electrodes and penetrating, with their pointed ends, into said solid electrodes for effecting an equipotential connection between said solid electrodes.

4. Ozone generator according to claim 1 in combination with a casing filled with water, said generator being immersed in the water.

5. Ozone generator according to claim 4 further comprising clamping means pressing said solid electrodes and said plates together and tightly clamping said ring between said plates for compressing said ring.

6. Ozone generator according to claim 1 further comprising clamping means pressing said solid electrodes and said plates together and tightly clamping said ring between said plates for compressing said ring.

* * * * *